US 11,924,325 B2

(12) United States Patent
Vincent et al.

(10) Patent No.: US 11,924,325 B2
(45) Date of Patent: Mar. 5, 2024

(54) BLOCKCHAIN-IMPLEMENTED METHOD AND SYSTEM

(71) Applicant: nChain Licensing AG, Zug (CH)

(72) Inventors: Stephane Vincent, Luxembourg (LU); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/722,367

(22) Filed: Apr. 17, 2022

(65) Prior Publication Data

US 2022/0321323 A1    Oct. 6, 2022

Related U.S. Application Data

(63) Continuation of application No. 16/320,969, filed as application No. PCT/IB2017/054429 on Jul. 21, 2017, now Pat. No. 11,310,031.

(30) Foreign Application Priority Data

Jul. 29, 2016    (GB) ..................... 1613144

(51) Int. Cl.
*H04L 29/06*    (2006.01)
*G06Q 20/06*    (2012.01)
(Continued)

(52) U.S. Cl.
CPC ......... *H04L 9/0637* (2013.01); *G06Q 20/065* (2013.01); *G06Q 20/127* (2013.01);
(Continued)

(58) Field of Classification Search
CPC ... H04L 9/0637; H04L 9/0643; H04L 9/0825; H04L 9/50; H04L 2209/56; G06Q 20/065; G06Q 20/127; G06Q 2220/00
(Continued)

(56) References Cited

U.S. PATENT DOCUMENTS 7,953,671 B2    5/2011    Bishop et al.
10,050,779 B2    8/2018    Alness et al.
(Continued)

FOREIGN PATENT DOCUMENTS

JP    2006262184 A    9/2006
JP    2009271631 A    11/2009
(Continued)

OTHER PUBLICATIONS

Blockchain-Based Publishing Layer for the Keyless Signing Infrastructure, Jamthagen et al, Jul. 1, 2016 (Year: 2016).*
(Continued)

*Primary Examiner* — Jahangir Kabir
(74) *Attorney, Agent, or Firm* — Davis Wright Tremaine LLP

(57) ABSTRACT

Techniques are presented for controlling or influencing use of and/or access to a resource. This resource may be a device, such as an IoT (Internet of Things) device or a process. Techniques include a method comprising generating a blockchain transaction (TxA) indicative of a condition on use of, or access to, the resource for a specified period of time, the blockchain transaction comprising a multi-signature script requiring a plurality of signatures for completion of the blockchain transaction; providing a first subset of the plurality of signatures to the blockchain transaction (TxA) to generate a partially signed signature script to partially complete the blockchain transaction (SI 14); and responsive to the condition on the use of, or access to, the resource being satisfied, providing a second subset of the plurality of signatures (S204) to the blockchain transaction to fully complete the blockchain transaction.

15 Claims, 6 Drawing Sheets

(51) Int. Cl.
  *G06Q 20/12* (2012.01)
  *G06Q 20/38* (2012.01)
  *H04L 9/06* (2006.01)
  *H04L 9/08* (2006.01)
  *H04L 9/32* (2006.01)
  *H04L 9/00* (2022.01)

(52) U.S. Cl.
  CPC ....... *G06Q 20/3825* (2013.01); *H04L 9/0643* (2013.01); *H04L 9/0825* (2013.01); *H04L 9/3247* (2013.01); *G06Q 2220/00* (2013.01); *H04L 9/50* (2022.05); *H04L 2209/56* (2013.01)

(58) Field of Classification Search
  USPC .......................................................... 713/189
  See application file for complete search history.

(56) References Cited

U.S. PATENT DOCUMENTS

| | | | |
|---|---|---|---|
| 11,475,442 B1 * | 10/2022 | James | G06Q 20/3829 |
| 2002/0128983 A1 | 9/2002 | Wrona et al. | |
| 2009/0216680 A1 | 8/2009 | McCown et al. | |
| 2013/0246280 A1 | 9/2013 | Kirsch | |
| 2015/0244690 A1 | 8/2015 | Mossbarger | |
| 2015/0324789 A1 | 11/2015 | Dvorak et al. | |
| 2015/0332224 A1 | 11/2015 | Melika et al. | |
| 2016/0283941 A1 | 9/2016 | Andrade | |
| 2017/0091397 A1 * | 3/2017 | Shah | H04L 63/20 |
| 2017/0206532 A1 | 7/2017 | Choi | |
| 2018/0025166 A1 | 1/2018 | Daniel et al. | |
| 2018/0205555 A1 | 7/2018 | Watanabe et al. | |

FOREIGN PATENT DOCUMENTS

| | | |
|---|---|---|
| JP | 2011513839 A | 4/2011 |
| WO | 2016128491 A1 | 8/2016 |

OTHER PUBLICATIONS

Anonymous, "Internet of Things," Wikipedia the Free Encyclopedia, page created 2007 (last edited May 18, 2021) [retrieved May 18, 2021], https://en.wikipedia.org/wiki/Internet_of_things, 42 pges.
Bitcoinj, "Partial signing," bitcoinj, retreived Jan. 24, 2017, https://bitcoinj.github.io/working-with-contracts#partial-signing, 3 pages.
Christidis et al., "Blockchains and Smart Contracts for the Internet of Things," IEEE Access 4(1):2292-2303, May 10, 2016.
Drwasho, "Decentralized Reputation in OpenBazaar," Openbazzar, Oct. 8, 2015, https://blog.openbazaar.org/decentralized-reputation-in-openbazaar/, 24 pages.
Hillbom et al., "Applications of smart-contracts and smart-property utilizing blockchains," Chalmers University of Technology and University of Gothenburg Department of Computer Science and Engineering, Master of Science Thesis in Computer Science: Algorithms, Languages and Logic, Feb. 2016, 51 pages.
International Search Report and Written Opinion dated Oct. 12, 2017, Patent Application No. PCT/IB2017/054429, 10 pages.
Nakamoto, "Bitcoin: A Peer-to-Peer Electronic Cash System," Bitcoin, Oct. 31, 2008, https://bitcoin.org/bitcoin.pdf, 9 pages.
Pureswaran, "Empowering the edge: Practical insights on a decentralized Internet of Things," IBM Institute for Business Value, 2015, 24 pages.
Tschorsch et al., "Bitcoin and beyond: A technical survey on decentralized digital currencies," IEEE Communications Surveys and Tutorials 18(3):2084-123, Mar. 2, 2016.
UK Commercial Search Report dated Nov. 24, 2016, Patent Application No. GB1613144.3, 5 pages.
UK IPO Search Report dated Feb. 6, 2017, Patent Application No. GB1613144.3, 5 pages.
Satoshi et al., "Connection Limits," Bitcoin Forum, Aug. 9, 2010, https://bitcointalk.org/index.php?topic=741.0;prev_next=prev, 2 pages.
Antonopoulos, "Mastering Bitcoin—Unlocking Digital Cryptocurrencies," O'Reilly Media, Inc., Dec. 20, 2014, 282 pages.

* cited by examiner

| | | |
|---|---|---|
| Previous transaction | Hash | Hash(previous Tx) |
| | Output index | 00 |
| Length of signature script | | |
| Signature script | | \<Alice's signature\>\<Alice's public key\> |
| SIGHASH flag | | SIGHASH_ALL |
| Sequence number | | |
| Value | | 1 BTC |
| Length of public key script | | |
| Public key script | | OP_2 \<Bob's public key\>\<Q_1's public key\>\<Alice's public key\> OP_3 OP_CHECKMULTISIG |

Fig. 2

| | |
| --- | --- |
| Previous transaction | |
| Hash | Hash(tx1) |
| Output index | 00 |
| Length of signature script | |
| Signature script | <not signed> |
| SIGHASH flag | |
| Sequence number | |
| Value | 2 |
| Length of public key script | |
| Public key script | OP_DUP OP_HASH160 <Bob's public key Hash> OP_EQUAL OP_CHECKSIG |
| Value | 1 BTC |
| Length of public key script | |
| Public key script | OP_DUP OP_HASH160 <Alice's public key Hash> OP_EQUAL OP_CHECKSIG |

Fig. 3

| | | |
|---|---|---|
| Previous transaction | Hash | Hash(Tx1) |
| | Output index | 00 |
| Length of signature script | | |
| Signature script | | <O₁'s signature> |
| SIGHASH flag | | |
| Sequence number | | |
| Value | | 3 BTC |
| Length of public key script | | |
| Public key script | | OP_DUP OP_HASH160 <Alice's public key Hash> OP_EQUAL OP_CHECKSIG Later time |

Fig. 5

BLOCKCHAIN-IMPLEMENTED METHOD AND SYSTEM

CROSS REFERENCE TO RELATED APPLICATIONS

This application is a continuation of U.S. patent application Ser. No. 16/320,969, filed Jan. 25, 2019, entitled "BLOCKCHAIN-IMPLEMENTED METHOD AND SYSTEM," which is a 371 Nationalization of International Patent Application No. PCT/IB2017/054429, filed Jul. 21, 2017, entitled "BLOCKCHAIN-IMPLEMENTED METHOD AND SYSTEM," which claims priority to United Kingdom Patent Application No. 1613144.3, filed Jul. 29, 2016, the disclosures of which are herein incorporated by reference in their entirety.

The invention relates generally to Distributed Ledger Technologies (DLTs), and more particularly the use of a blockchain for controlling the use of a resource. Aspects of the invention relate also to the Internet of Things (IoT). The invention may be suited for controlling an IoT device.

In this document we use the term 'blockchain' for the sake of convenience and ease of reference because it is currently the most widely known term in this context. The term is used herein to include all forms of electronic, computer-based distributed ledgers, including consensus-based blockchains, alt-chains, sidechains and transaction-chain technologies, private and public ledgers, permissioned and un-permissioned ledgers, shared ledgers and variations thereof.

A blockchain is an electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems.

One area of current interest and research is the use of the blockchain for the implementation of "smart contracts". These are computer programs designed to automate the execution of the terms of a contract or agreement. Unlike a traditional contract which would be written in natural language, a smart contract is a machine executable program which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced.

The invention also relates to the use of a blockchain-implemented mechanism to control access to a resource. This resource can be a physical resource such as an "internet of things (IoT)" device. IoT has been described by Wikipedia as "the network of physical devices, vehicles, buildings and other items embedded with electronics, software, sensors, and network connectivity that enables these objects to collect and exchange data . . . . The IoT allows objects to be sensed and controlled remotely across existing network infrastructure". In other embodiments, the resource may be a non-physical resource such as a network or software, a portion of cryptocurrency or any other form of asset.

The present invention is defined in the appended claims.

The present invention provides a computer-implemented method and corresponding system. The invention may provide a blockchain implemented control method. The method may be arranged to enable, influence, manage or control of use and/or access to a resource. The resource may be an internet-enabled resource. It may be an IoT (Internet of Things) resource. The resource may be a physical resource such as a device or apparatus, or a process. The resource may be a computer-based resource such as a network or piece of software.

The method may comprise the steps:
generating a blockchain transaction (TxA) indicative of a condition on use of the resource. The blockchain transaction may comprise a multi-signature script requiring a plurality of (digital) signatures for completion of the blockchain transaction; and/or
providing a first subset of the plurality of signatures to the blockchain transaction to generate a partially signed signature script to partially complete the blockchain transaction; and/or
responsive to the condition on the use of the resource being satisfied, providing a second subset of the plurality of signatures to the blockchain transaction to fully complete the blockchain transaction (TxA).

By providing such a method, the advantage is provided that use of/access to the resource can be securely performed and immutably recorded. For the sake of readability, we may hereafter simply refer to "use of" the resource, and not repeat the term "and/or access to".

The condition on the use of the resource may be the use of a discrete amount of the resource and the second subset of the plurality of signatures may be provided responsive to the discrete amount of the resource being used. The condition on the use of the resource may be specified or defined in a smart contract. The smart contract may be stored off the blockchain but referenced from the blockchain eg using metadata provided within a transaction.

This provides the advantage that the resource may be used or consumed incrementally.

In the event that the condition on the use of/access to the resource is not satisfied: access to, or use of, the resource may be prohibited or altered or restricted; and/or an alert or notification may be sent to a destination.

A plurality of transactions may be generated. These may be partially signed transactions. They may be multi-signature transactions. The final step of providing the second subset of the plurality of signatures to transaction TxA to complete transaction TxA may comprise: selecting the transaction (TxA) from the plurality transactions. Each of the plurality of transactions may be arranged to spend the same output of a previous transaction (Tx1). ("Previous" meaning that the transaction which includes the output precedes the plurality of transactions on the blockchain). Thus, upon determination that the condition has been met, the transaction (TxA) may be selected from the plurality of partially signed transactions, and completed. Selection and/or completion of the transaction may comprise provision of the agent's cryptographic key, and may be performed by an agent. The agent may be a suitably-programmed automated resource. The agent may submit the selected transaction (TxA) to the blockchain network. Validation of the transaction on the blockchain may cause an asset such as a portion of cryptocurrency, to be transferred from one party to another by spending a transaction output (TX1 output) on the blockchain.

Each of the transactions in the plurality may be indicative of a different condition relating to the use of the resource. Thus, the plurality of transactions may implement a plurality of conditions (or scenarios) relating to the use of the resource. By selecting which transaction to complete and submit, the invention controls how the output of the transaction (Tx1) is spent and how the cryptocurrency associated with the output is transferred.

Satisfaction of the condition(s) may be determined by an agent using an input or signal to evaluate the condition. This input or signal may be generated by the agent, or may be received from another source. The input or signal may be, for example, detection of a physical or electronic state, a point in time or any other input.

Generating a blockchain transaction indicative of a condition on use of the resource may comprise generating a blockchain transaction corresponding to each integer multiple of the discrete amount of the resource and the second subset of the plurality of signatures may be provided for use of each increasing integer multiple of the resource.

This provides the advantage of providing a range of possible use options, thereby increasing the versatility of the method. For example, portions or amount of network usage, or length of time that a resource such as a parking space, device etc is used.

A maximum limit on the integer multiple may be predefined.

This provides the advantage of allowing consequences due to overuse of the resource to be implied and enforced.

Responsive to the exceedance of the maximum limit, an off-block action may be generated. The term 'off-block' may be construed as meaning 'not via the blockchain'.

This provides the advantage of providing consequences due to overuse of the resource to be carried out.

The first subset of the plurality of signatures may comprise a signature from an agent. The agent may be a computing-based resource.

This provides the advantage of increasing the security of the method.

The first subset of the plurality of signatures may comprise a signature from an issuer or owner or controller of the resource.

The second subset of the plurality of signatures may comprise a signature from an agent.

The second subset of the plurality of signatures may comprise a signature from a user of the resource.

This provides the advantage of preventing either the issuer or the user from exploiting the method.

The condition on use of the resource may be that a zero amount of the resource has been used.

This provides the advantage of defining conditions for a refund to be issued.

The blockchain transaction may have a non-zero locking time.

This provides the advantage of preventing the user from exploiting the method.

The invention may also provide a system comprising a computer-based resource arranged or configured to carry out a method according to any embodiment of the method described herein. Any feature(s) mentioned in relation to one aspect or embodiment of the invention may also be applied to any other aspect or embodiment. Any feature(s) mentioned in relation to the method may be applied to the system of the invention and vice versa. An embodiment of the invention may be arranged substantially as described below.

These and other aspects of the present invention will be apparent from and elucidated with reference to, the embodiment described herein.

An embodiment of the present invention will now be described, by way of example only, and with reference to the accompany drawings, in which:

FIG. 2 is a transaction by which Alice pays for her parking for an initial period;

FIG. 3 is a transaction generated by an agent and sent to Bob for his signature before signature by the agent when the parking space has been used for a period of 10 minutes over the time;

Figure 4:
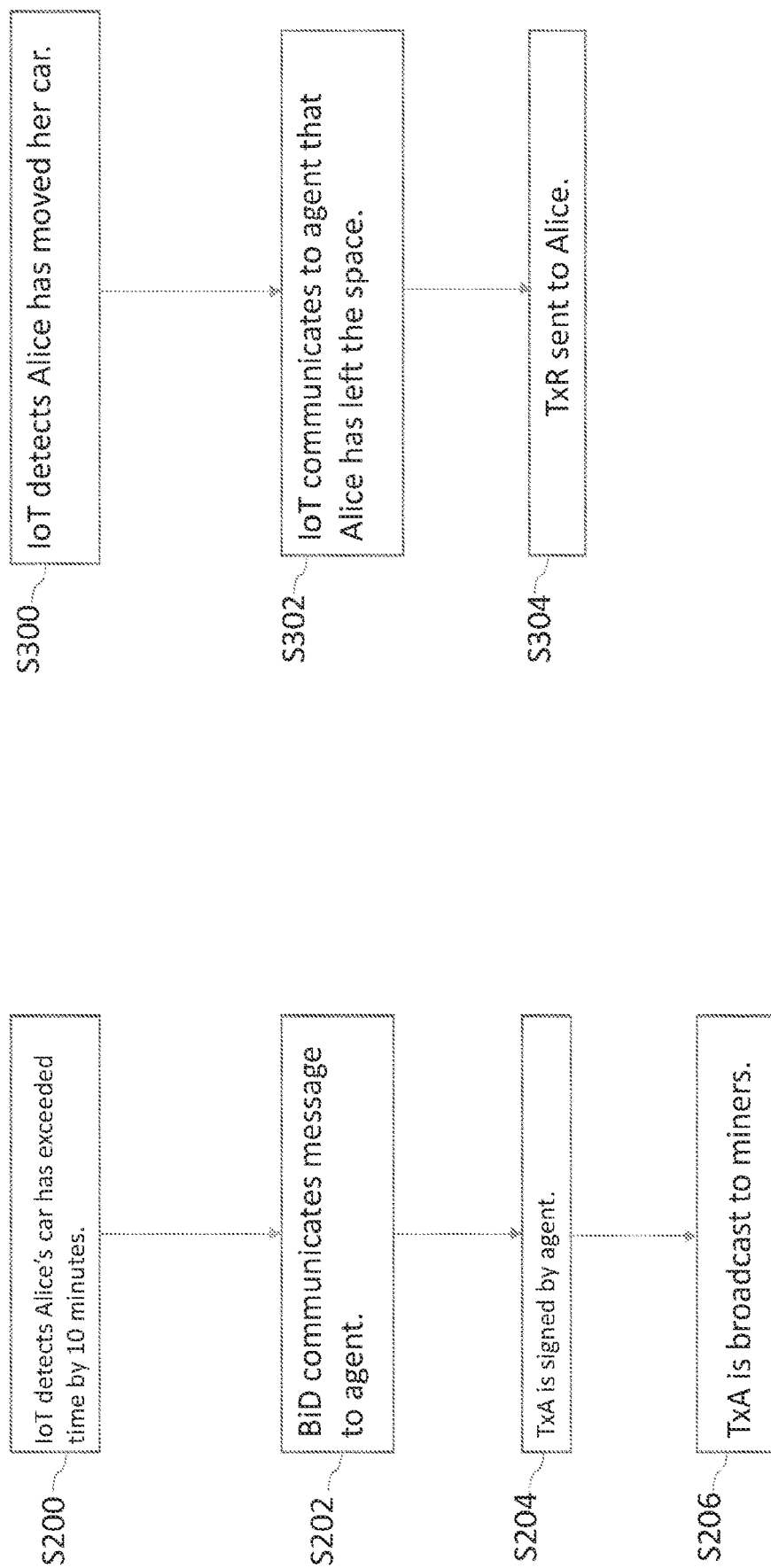

FIGS. 4a and 4b schematically illustrate different scenarios in respect of the use of the parking space; and FIG. 5 is a transaction generated by an agent which is signed by the agent and sent to Alice when the excess time is not used.

OVERVIEW

The invention provides a novel technique for permitting use of and/or access to a controlled resource, or managing access to/use of the resource. This is achieved via the use of multiple blockchain transactions which implement different use/access scenarios relating to the use or access. For example, a transaction relating to use of the resource for specified period of time, and another relating to use of the resource for a different period of time.

The user (ie the person accessing or using the resource) performs a deliberate "double spend" attempt on the blockchain. As known in the art, a "double spend" occurs when a user manages to spend the same portion of cryptocurrency e.g. Bitcoins twice. Clearly, double spends are undesirable in the conventional context, as at least one party will be disadvantaged by not receiving the funds that they were expecting or legitimately owed. The Bitcoin protocol protects against double spends via its verification mechanism. The present invention therefore takes a process which is conventionally undesirable and uses it to advantage, for authorization purposes.

In accordance with the present invention, the resource user provides an asset to the resource controller. This asset may be a portion of cryptocurrency which we will refer to as Bitcoin(s) for the sake of convenience, although other cryptocurrencies could be used. The amount of that Bitcoins is determined by a set of condition rules that are typically defined within a smart contract. The smart contract is a blockchain-implemented, machine executable document and may be stored off-chain but referenced via a blockchain transaction (Tx). The condition rules can include various rules, criteria and parameters etc which govern or define the authorised, legitimate use/access of the resource. In a preferred embodiment, these condition rules are evaluated by an independent party i.e. a party other than the resource user or controller.

Thus, advantageously, the resource controller has certainty that the conditions will be fulfilled, without having to know the details of the fulfilment conditions as these will be determined and enforced by an independent party. This may be an automated agent, which may be referred to as an oracle. The oracle determines fulfilment of the conditions based on an evaluation that is performed. This could be when use/release/access to the resource is permitted, or at a pre-determined time, or when a trigger event is detected etc. This assessment enables the oracle to select one of the proposed blockchain transactions for progression to completion. This is achieved by providing the oracle's cryptographic signature to the selected transaction. Thus, there is an external oracle, evaluating the condition(s) provided by the smart contract and based upon parameters relating to use/access e.g. how long the resource has been used for, determining which of the plurality of presented transactions (Txs) is completed. This then automatically invalidates the other proposed transaction(s).

Responsive steps can be taken by the oracle and/or resource controller in the event that the oracle or agent determines that the condition(s) are not met. For example, use/access to the resource can be denied, a locking mechanism can be applied or configured, or a communication such as an alert may sent to a recipient, and/or a refund transaction may be submitted to the blockchain network.

Illustrative Use Case

We describe a system in accordance with an illustrative embodiment using the example of a car parking space where a fee is charged for parking in the space. Participating car parking space owners (either established parking space operators or small businesses or private individuals with available and desirable parking spaces) attach an IOT device 104 to the parking spot. The invention is not limited, however, to use with parking meters. Other types of controlled, internet-enabled resources may be the subject of the invention instead.

The IOT device 104 is capable of detecting the presence of a parked vehicle (as is already common practice). The device may be a part of, or may be, a Blockchain IOT Device 106. A programmable "Blockchain IOT Device (BID)" is an internet-enabled device which is also able to monitor, interact with and publish to a blockchain network.

Vehicle drivers download a smartphone app (or a 'smart car' app—i.e. an app designed to run on car computers) compatible with the carpark BID 106. The app allows the driver to pay for the car space via the Blockchain using cryptocurrency or tokenised cryptocurrency.

The parking service may be represented using a smart contract. This is a machine readable and executable document. The terms and conditions in the contract are referenced using metadata in Transactions (Txs) that point to the location of the contract file on a DHT. In other embodiments, the contract could be stored in any other form of database or storage arrangement. The terms and conditions set out in the contract may include the following:

The vehicle ID (e.g. number plate)
The start-time for parking
The expiry time
The car space identifier (e.g. Precise GPS location, or residential address, or address+a sequential number (which may also be painted on the actual space or otherwise indicated at the physical location of the space)
The rate (which may be expressed for example in satoshis/minute, or $/minute, etc)
Other complex conditions such as:
  First 2 hours (or other period) free
  Cost is in partial periods (e.g. '0.01BTC per hour or part thereof')

In some embodiments the BID 106 is able to identify the vehicle via one of several methods, for example the BID 106 may include an inbuilt camera aimed at the general area of vehicle number plates; in another example the BID 106 detects a unique signal ID emitted by the vehicle, in another example a purpose built car-tag RFID is attached to the vehicle. In some embodiments the BID 106 is not able to identify the vehicle (e.g. for privacy purposes) and instead parking attendants are able to verify the correct vehicle is parked by visually checking the number plate against the number plate registered in the paying Transaction.

The app may allow a range of functions, for example:
  The driver can reserve the spot for a future period
    The reservation may require a pre-payment in bitcoin (or not)
  The driver can set the app to automatically pay for and roll over for another period (adjustable) if the paid time expires.
  The app may allow for regular parking (e.g. reserved for weekdays)

Figure 1A:
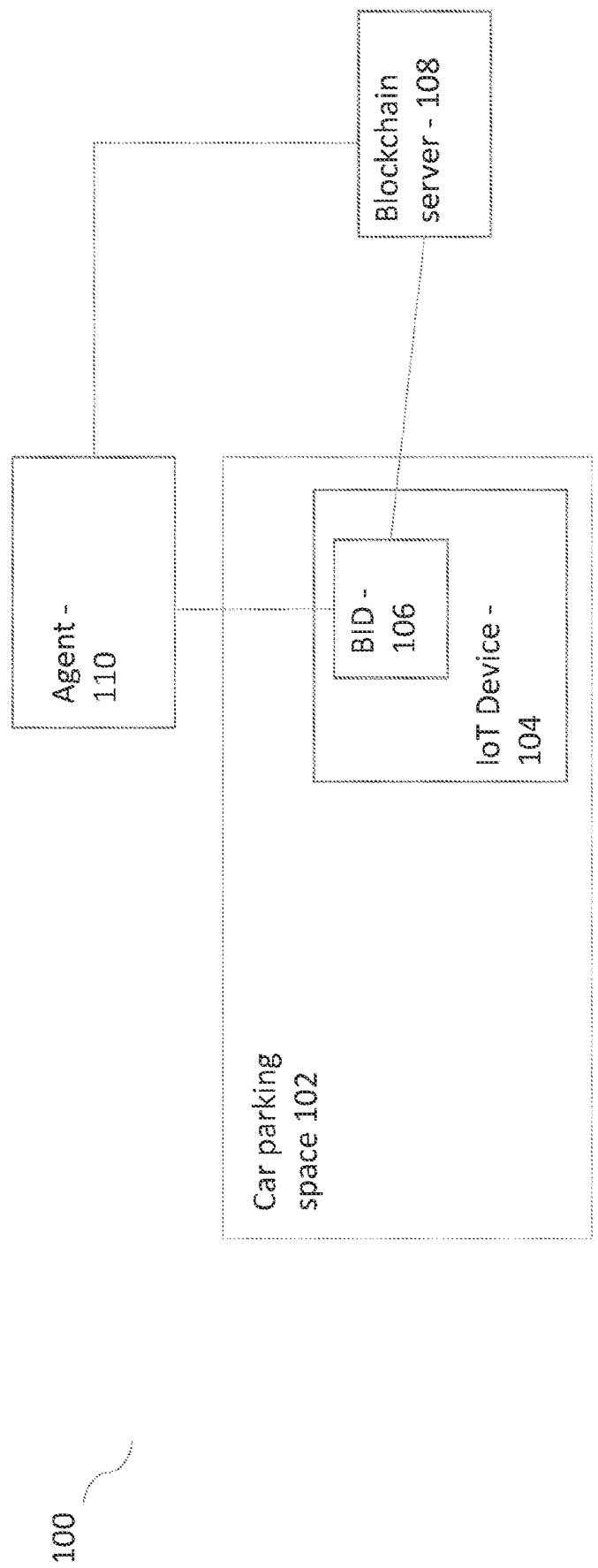
FIG. 1a is a schematic illustration of a system in accordance with the embodiment.

As illustrated in FIG. 1*a*, System 100 comprises the car parking space 102, the Internet-enabled (Internet-of-Things or "IoT") device 104, the Blockchain Internet-of-Things device (BID) 106, a blockchain server 108 which is operative to provide access to the peer-to-peer network which underpins the blockchain, and an agent 110 which is operative to monitor the blockchain and is in communication with the IoT device 104 and the BID 106.

Figure 1B:
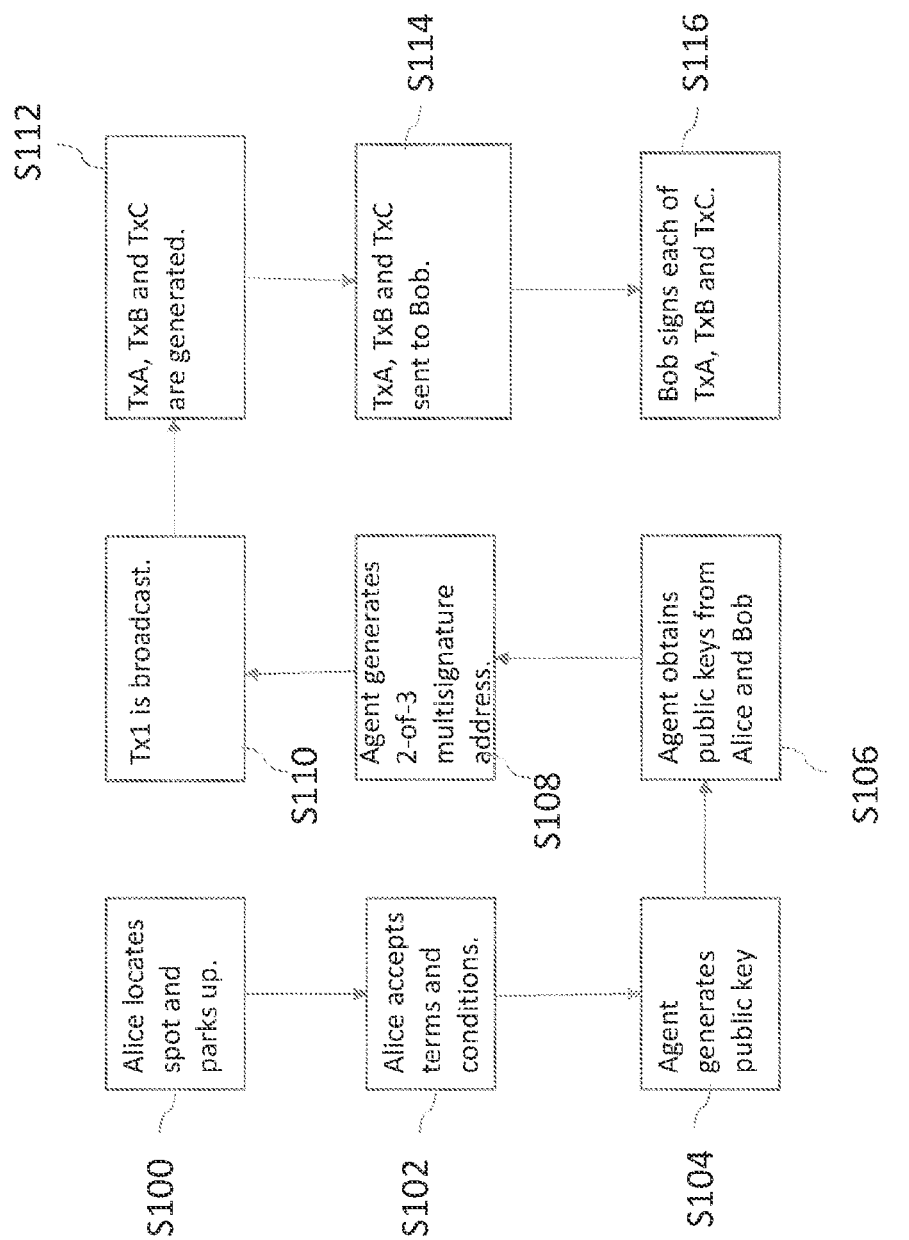
FIG. 1b is flowchart illustrating how a customer may set up a series of blockchain transactions to pay for parking using the system.

We now describe the use of a parking space using system 100 with reference to the flowchart in FIG. 1*b*. Alice has a smartphone app that indicates the location of available car spaces by interrogating the Blockchain. She locates a convenient spot and parks her car in step S100. The app indicates the terms and conditions for this space which could, for example, be in the driveway of a residence in a dense inner-city location such as London or Los Angeles.

In step S102, Alice accepts the terms and conditions and, after selecting certain options, uses the app to pay for the space for the required time in bitcoins. She is not 100% sure she will be back in time so she also selects the option provided by the application to automatically pay to extend the parking period by 10 minutes each time it expires, up to 3 times (she thinks the premium for this facility is a bit expensive but she is willing to pay this to avoid the fine and reputation damage if she gets back after expiry).

Of course, Alice knows the smartphone app provides the functionality to simply extend the period remotely if the expiry time looms, but as she will be in meetings she cannot be sure she will get that opportunity). Later, Alice returns ahead of the expiry time. Although the smartphone app allows her to cancel the unneeded rollovers she knows in this case she does not need to because this BID 106 operator has settings that allow her to simply depart and the BID 106 detects that she has not used the rollovers and so (as per contract) automatically cancels the rollovers for her.

So, let us assume that Alice rents the parking space for 1 hour at the cost of 5BTC, and the extra time cost is 1BTC/10 minutes.

The first transaction crediting Bob 5BTC is a P2PKH which pays for the first hour. This is a standard Bitcoin transaction.

We define $T_{extra}$ as the time Alice's car stays parked on the parking space after the nominal time period, i.e. after the first hour which has already been paid for.

$T_{extra}$ is a multiple of 10 and takes the values 0, 10, 20, 30. At time T=60, 70, 80 and 90 minutes, the BID 106 checks if the vehicle is still parked on the parking space. If not, the BID 106 sends messages to Alice, Bob, the parking space owner, and a third party or "agent". The messages include the value $T_{extra}$. For example, if Alice returns to the parking space at time 65, $T_{extra}$=10, and Bob should charge Alice 1BTC. However, Alice doesn't trust Bob, and she would prefer to use an independent service to release the funds, and the release should be conditional on the signature of an agent server. The agent accepts requests, for example is $T_{extra}$=10?, evaluates them, and produce an output. The agent receives the information from the IoT device 104.

Alice and Bob agree on the rule script and send it to the agent server ($O_1$). The script might look like this:

If ($T_{extra}$==10)
   return Sign TxA
else if ($T_{extra}$==20)
   return Sign TxB
else if ($T_{extra}$==30)
   return Sign TxC
else
   return False If $O_1$ resolves the script favourably, i.e. one of the conditions on the use of the parking space is satisfied it signs and broadcasts either TxA, TxB, or TxC (but not all of them).

The agent generates a new public key in a step S104. The agent obtains public keys from Alice and Bob in a step S106. The agent then generates a 2-of-3 multi-signature address in step S108.

Alice generates a new transaction Tx1 that sends 3BTC to the multisig address, signs Tx1 and broadcasts it across the Bitcoin network in a step S110. This transaction is illustrated in FIG. 2.

The agent verifies Tx1 and generates three transactions spending the UTXO of TX1 in a step S112. The three transactions can be denoted as TxA, TxB and TxC. The agent also generates a fourth transaction TxR in step S112. TxA is illustrated in FIG. 3. TxB and TxC are similar but for differing amounts of bitcoin as set out below.

As can be seen from FIG. 3, TxA sends 1BTC to Bob and 2BTC to Alice, and corresponds to $T_{extra}$=10. TxB sends 2BTC to Bob and 1BTC to Alice, and corresponds to $T_{extra}$=20. TxC sends 3BTC to Bob, and corresponds to $T_{extra}$=30.

Each of TxA, TxB and TxC require 2 signatures in the form of Bob's signature and the agent's signature. The agent transmits TxA, TxB and TxC to Bob in a step S114. Bob then signs each of TxA, TxB and TxC and returns them to the agent as incomplete blockchain transactions in a step S116.

TxR is a refund transaction that sends 3BTC back to Alice; it has a non-zero lock time corresponding to a certain moment in the future. TxR requires two signatures in the form of Alice's signature and the agent signature. That is to say, if Alice does not use the parking space for an amount of time over what has been paid for in Tx1, a refund will automatically be issued. TxR is signed by the agent upon generation in step S112. TxR is illustrated in FIG. 5.

Now we consider the example where Alice has parked in the parking space for up to 10 minutes over the hour she paid for with Tx1. That is to say, $T_{extra}$=10. This is illustrated with reference to FIG. 4a.

In a step S200, the IOT device 104 detects that Alice's car has been parked in the space for 10 minutes in excess of the hour paid for in Tx1. The BID 106 then communicates that the car has been parked in the space for the extra 10 minutes to the agent in a step S202, i.e. $T_{extra}$=10. That is to say, one of the conditions in the script above has been evaluated by the agent to true.

The agent then signs TxA to complete the transaction in a step S204. TxA can then be broadcast to the blockchain in a step S206. The completion of TxA pays 1BTC to Bob and 2BTC to Alice. TxB and TxC can be completed similarly.

Now we consider the example where Alice leaves the parking space on time and $T_{extra}$=0. This is described with reference to FIG. 4b. In a step S300, the IoT device 104 detects that Alice has moved her car from the parking space before any excess time has accrued. In step S302, the IoT device 104 communicates to the agent that Alice has left the space on time. In step S304, the IoT device 104 sends TxR to Alice who signs it to complete transaction TxR. The completion of the transaction TxR means that Alice has the 3 BTC back. TxR has a non-zero locking time which means that it may not be mined and added to the blockchain until that locking time has expired. This means that, provided Alice provides the signature, TxR is broadcast at some point in the future and not immediately.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A blockchain-implemented method of controlling access to a resource, the method comprising:
   generating a blockchain transaction (TxA) indicative of a condition on use of, or access to, the resource for a specified period of time, the blockchain transaction comprising a multi-signature script requiring a plurality of signatures for completion of the blockchain transaction;

providing a first subset of the plurality of signatures to the blockchain transaction (TxA) to generate a partially signed signature script to partially complete the blockchain transaction (SI 14); and responsive to the condition on the use of, or access to, the resource being satisfied, providing a second subset of the plurality of signatures (S204) to the blockchain transaction to fully complete the blockchain transaction.

2. The blockchain-implemented method of claim 1, wherein the specified period of time is defined within a smart contract stored off the blockchain but referenced from the blockchain.

3. The blockchain-implemented method of claim 1, wherein the step of providing the second subset of the plurality of signatures to the blockchain transaction (TxA) further comprises:

selecting the transaction (TxA) from a plurality of partially signed, multi-signature transactions (SI 12).

4. The blockchain-implemented method of claim 1, wherein the condition on the use of the resource is the use of a discrete amount of the resource and the second subset of the plurality of signatures is provided responsive to the discrete amount of the resource being used.

5. The blockchain-implemented method of claim 4, wherein generating a blockchain transaction indicative of a condition on access to the resource comprises generating a blockchain transaction corresponding to each integer multiple of the discrete amount of the resource and the second subset of the plurality of signatures is provided for use of each increasing integer multiple of the resource.

6. The blockchain-implemented method of claim 5, wherein a maximum limit on the integer multiple is predefined.

7. The blockchain-implemented method of claim 6, wherein, responsive to exceedance of the maximum limit, an off-block action is generated.

8. The blockchain-implemented method of claim 1, wherein the first subset of the plurality of signatures comprises a signature from an agent.

9. The blockchain-implemented method of claim 1, wherein the first subset of the plurality of signatures comprises a signature from an issuer of the resource.

10. The blockchain-implemented method of claim 9, wherein the second subset of the plurality of signatures comprises a signature from an agent.

11. The blockchain-implemented method of claim 8, wherein the second subset of the plurality of signatures comprises a signature from a user of the resource.

12. The blockchain-implemented method of claim 1, wherein the condition on use of the resource is that a zero amount of the resource has been used.

13. The blockchain-implemented method of claim 1, wherein the blockchain transaction has a non-zero locking time.

14. The blockchain-implemented method of claim 1, further comprising: submitting the fully completed transaction to the blockchain to spend an output associated with a previous transaction (Tx1).

15. A system comprising a processor and storing memory, the memory including instructions that, when executed by the processor, cause the processor to:

generate a blockchain transaction (TxA) indicative of a condition on use of, or access to, a resource for a specified period of time, the blockchain transaction comprising a multi-signature script requiring a plurality of signatures for completion of the blockchain transaction;

provide a first subset of the plurality of signatures to the blockchain transaction (TxA) to generate a partially signed signature script to partially complete the blockchain transaction (SI 14); and provide responsive to the condition on the use of, or access to, the resource being satisfied, a second subset of the plurality of signatures (S204) to the blockchain transaction to fully complete the blockchain transaction.

* * * * *